UNITED STATES PATENT OFFICE.

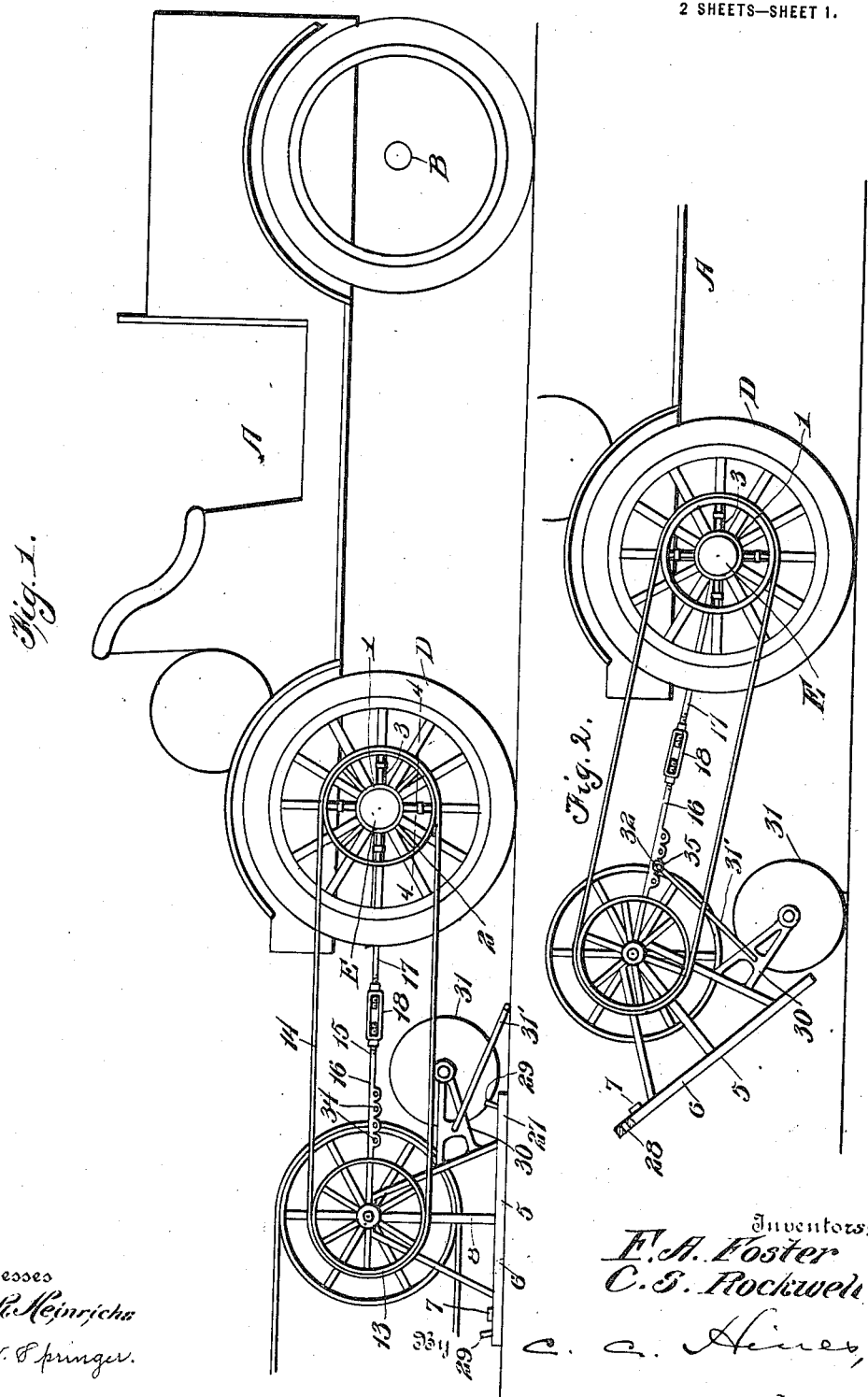

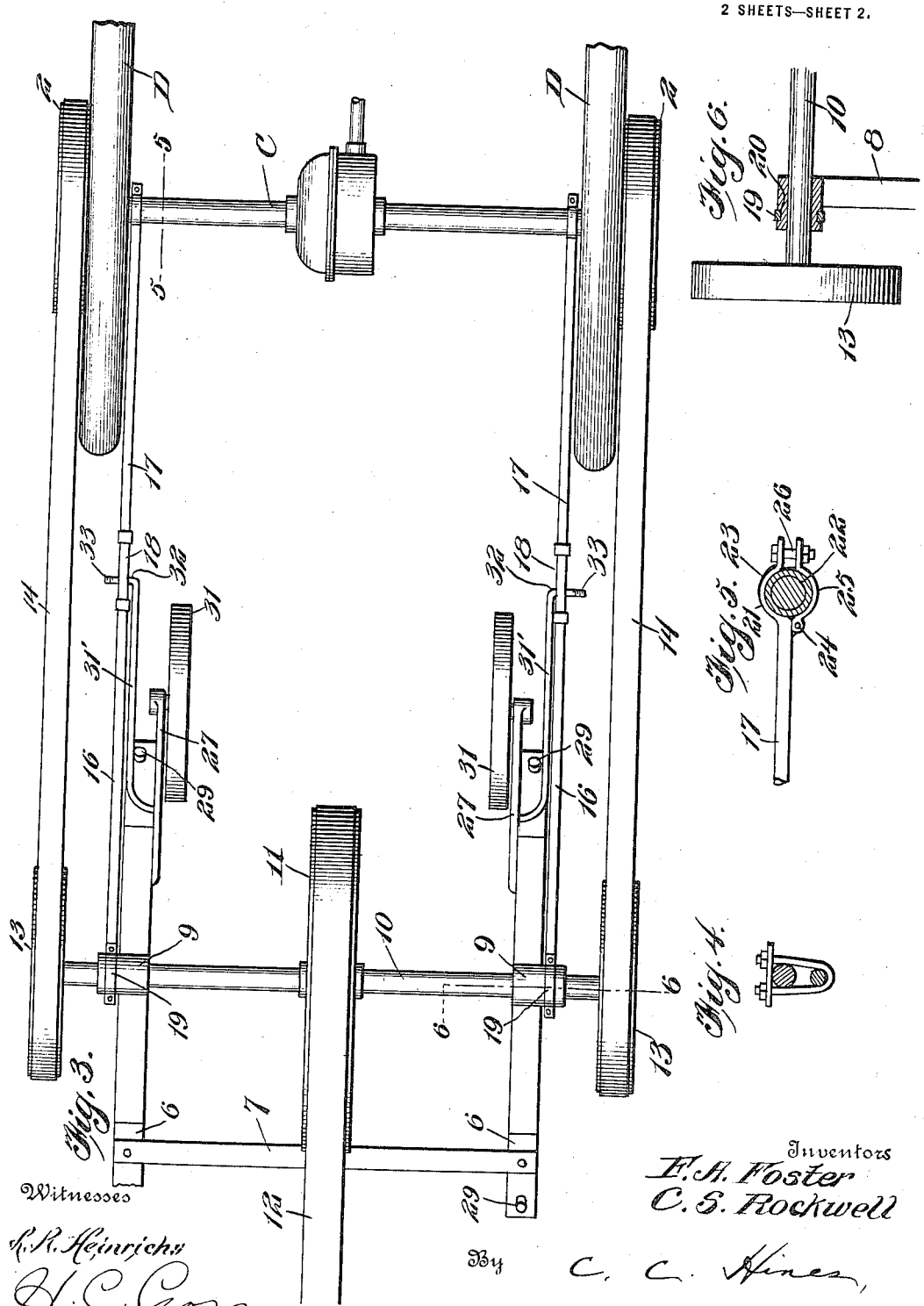

FRANK A. FOSTER AND CLAYTON S. ROCKWELL, OF CISCO, TEXAS.

POWER-TRANSMITTING DEVICE.

1,149,040.

Specification of Letters Patent. Patented Aug. 3, 1915.

Application filed July 23, 1913. Serial No. 780,715.

*To all whom it may concern:*

Be it known that we, FRANK A. FOSTER and CLAYTON S. ROCKWELL, citizens of the United States of America, residing at Cisco, in the county of Eastland and State of Texas, have invented certain new and useful Improvements in Power-Transmitting Devices, of which the following is a specification.

This invention relates to power transmitting devices, and particularly to a device which may be directly connected with the driven axle of an automobile or like motor-driven conveyances and which will include a counter-shaft operated by the driven axle and supplied with means whereby the power of the driven shaft may be utilized for operating farm-machinery, such as threshing machines, feed-grinders, wood-sawing machines, corn shellers, or the like.

An object of the invention is the provision of means for facilitating the operation of connecting the device to or disconnecting the same from the vehicle as the occasion may demand.

A still further object of the invention is the provision of means for maintaining an operative connection of the device with the driven axle of the vehicle while the latter is in operation.

Another object of the invention is the provision of adjustable connecting means which will be constructed with a view to holding the driving belts under the required tension and for retaining the counter-shaft in parallel relation with the driven axle, so as to minimize the possibility of the belts slipping laterally from their supporting pulleys.

A still further object of the invention is the provision of a power transmitting device which will include a wheeled base, the wheels of which are disposed in inactive positions while the device is in operative power transmitting position, and further, the provision of means for permitting the base to be tilted and the wheels thereof disposed in ground engaging positions and the device then rendered capable of direct transportation by the vehicle as the latter is driven onto or off of the field or to different parts thereof relatively of the machine to which the power is to be conducted.

Another object of the invention is to provide means for holding the wheeled base against tilting movements while being drawn by the vehicle.

With these and other objects in view, the invention consists of certain novel features of construction, combination and arrangement of parts as will be hereinafter described and claimed.

In the accompanying drawings:—Figure 1 is a side view of an automobile, showing the power transmitting device in active power transmitting position relatively thereof; Fig. 2 is a similar view, showing the device tilted so as to be drawn by the vehicle; Fig. 3 is a top plan view of the driven axle of the vehicle, showing the same operatively connected with the power transmitting device; Fig. 4 is a horizontal section on the line 4—4 of Fig. 1; Fig. 5 is a section on the line 5—5 of Fig. 3; and Fig. 6 is a section on line 6—6 of Fig. 3.

With a view to providing power transmitting device of a portable character; one which may be connected with an automobile or like motor driven conveyance so that the power from the driven axle of the automobile may be utilized for driving any suitable well known forms of farm machinery or the like, and further, providing a device which may be conveniently connected to or disconnected from the vehicle as the occasion may demand, we make use of an automobile such as the one conventionally illustrated herein at A. This machine is provided with the usual wheeled front and rear axles B and C, the wheels D of the rear axle being provided with the usual hubs E, which are embraced by the hubs 1 of pulleys 2. These pulleys are provided with radial spokes 3 which lie directly beside adjacent spokes of the wheels D and which are connected therewith by means of U-clips 4 or other suitable well known fastening devices whereby the pulleys may be connected with or removed from the wheels D as may be found desirable.

The power transmitting device comprises a supporting base 5 which may include spaced relatively long plates 6 connected together by longitudinal braces 7 and provided with vertically rising stanchions 8 which terminate at their upper ends in bearings 9. These bearings have the ends of a counter-shaft 10 journaled therein, and as illustrated said shaft has fixedly secured thereto intermediate of its ends a power-transmitting pulley 11 over which may be extended a driving belt 12 adapted to be connected with the machine to which the power is to be supplied. In line with the pulleys 2 the counter-shaft is provided with fixed pulleys 13, which are connected with said pulleys 2 by means of driven belts 14 so that when power is supplied to the driven axle of the vehicle it may be transmitted to the shaft 10 as will be obviously understood.

In order that the counter-shaft 10 may be held in proper parallel position relatively to the driven axle of the vehicle, and further, with a view to maintaining an operative tensioned condition of the driven belts 14, we provide connecting and adjusting devices 15 between the counter-shaft and said driven axle. These devices consist of rod sections 16 and 17 threadedly connected adjacent their meeting ends by turn-buckles 18. The sections 16 are provided with sectional clamping straps 19, which embrace grooved portions 20 of the bearings 9. The sections 17 are provided with sectional straps 21, which are adapted to embrace the axle casings 22. These last-named straps have arcuate sections 23 which are permanently secured to the rods 17 and hingedly connected at 24 with the sections 25. The flanges on the sections 23 are adapted to be connected by fastening bolts 26 with the flanges on the free ends of the section 25. From this construction it is obviously seen that the turn-buckles 18 may be readily operated manually so as to retain the counter-shaft 10 in parallel relation to the driven axle of the vehicle and at the same time insure an operative tensioned condition of the driven belts 14 and prevent the belts from shifting laterally from the pulleys 2 and 13.

In order that the device may be securely anchored to the ground during the time of transferring the power from the driven axle to the counter-shaft and for holding the device against undue vibratory movements, we provide extensions 27 on the plates 6 and form in said extensions vertical passages 28 for the reception of stakes 29 which are adapted to enter the ground as will be understood.

With a view to facilitating the operation of transporting the device onto or off of the field and for eliminating the necessity of removing the device from the vehicle at such time, we provide the supporting base of the device with angularly extending brackets 30 having ground wheels 31 journaled therein and adapted to engage against the ground, as shown in Fig. 2. The brackets 30 are provided with pivotally mounted rods 31' having angular extensions 32 at their outer ends threaded at 33 and adapted to be interchangeably connected in a longitudinal series of passages 34 in the rod sections 16. Securing nuts 35 may be connected with the threaded ends of the extension 32 so as to hold the latter against withdrawal from the rod sections when the frame is tilted and arranged in transporting position. From this construction it is evident that the straps 21 form pivotal mountings by means of which the power transmitting device may be lifted above the surface of the ground and the device then tilted within the straps 19 of the rod sections 16.

Suitable jacks or means may be employed to elevate the wheels of the axle above the surface of the ground when it is desired to transfer the power from the axle to the counter-shaft of the power transmitting device.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described our invention, what we claim is:—

1. A power transmitting device comprising, in combination with a vehicle having a driven shaft provided with traction wheels, of a supporting frame provided with bearings, a countershaft journaled in said bearings, the bearings being spaced from each other a distance less than the distance between the wheels, and the countershaft having its ends extended beyond said bearings so as to project laterally beyond the line of the wheels, rods at each side of the frame pivotally engaging the countershaft, rods in longitudinal alinement with the first named rods and pivotally engaging the vehicle shaft, adjustable connections between the alined rods, a pulley upon the intermediate portion of the countershaft, pulleys upon the extended ends of the countershaft, pulleys detachably connected with the spokes of the vehicle wheels on the outer sides of said wheels, and belts connecting said pulleys with the pulleys upon the extended ends of the countershaft.

2. In a power transmitting device, a driven shaft, a wheeled frame, a countershaft journaled in said frame, means pivotally connecting and holding said shafts in spaced relation, a driving connection between said driven-shaft and counter-shaft, means for supporting the frame in tilted position, and means for holding said frame against tilting movement, substantially as described.

3. In a power transmitting device, a wheeled vehicle having a driven shaft, a portable frame, a counter-shaft carrying said frame and on which the latter is adapted to tilt, driving connections between said shafts, coupling means connecting the shafts for pivotal movement to dispose the frame in a normal operative or elevated inoperative position, means for holding the frame against pivotal movement when elevated, and wheels carried by the frame and adapted for contact with the ground when the frame is elevated, whereby the frame and parts carried thereby may be disposed for running motion with the vehicle.

4. A power transmitting device, comprising a wheeled frame, means for holding the frame against movements, a counter-shaft, connections between the counter-shaft and the frame supporting the latter for swinging movements, a driven shaft, a driving connection between the driven-shaft and said counter-shaft, adjusting means between the driven shaft and the frame, and means on the frame for connection with the adjusting means to hold the frame against tilting movements.

5. A power transmitting device comprising a frame having angularly disposed wheeled brackets thereon, a counter-shaft supported by the frame, a driven-shaft, coupling members pivotally connecting said shafts whereby the frame is mounted for tilting movement, and a driving connection between said shafts, substantially as described.

6. A power transmitting device comprising a frame a counter-shaft journaled on said frame, a driven-shaft, a driving connection between said counter shaft and driven-shaft, means for adjusting the counter-shaft relatively to the driven-shaft and holding the former parallel with respect to the latter, and means on said frame having adjustable connection with said adjusting means to hold said frame against tilting movement on said counter-shaft, substantially as described.

7. A power transmitting device comprising a wheeled frame having base bars normally lying below the wheels, a counter-shaft supported by the frame and connected therewith so as to permit the frame to be tilted thereon, a driven shaft, pulleys on the driven shaft, pulleys on the counter-shaft, belts connecting the pulleys of the counter-shaft with the pulleys of the driven shaft, means for holding the frame against tilting movements, and means for adjusting the frame relatively of the driven shaft.

8. A power transmitting device comprising, in combination with a vehicle having a driven shaft, of a wheeled frame having base bars normally supporting the wheels above the surface of the ground, a counter-shaft carried by the frame, means for adjusting the frame relatively of the driven shaft, the frame being mounted for tilting movements on said counter-shaft and adjustable to advance the wheels of the frame into engagement with the ground, means for holding the frame against tilting movements, and a driving connection between the counter-shaft and the driven shaft.

In testimony whereof we affix our signatures in presence of two witnesses.

FRANK A. FOSTER.
CLAYTON S. ROCKWELL.

Witnesses:
W. P. LEE,
E. C. McDONALD.